US011782222B2

United States Patent
Nakanishi et al.

(10) Patent No.: US 11,782,222 B2
(45) Date of Patent: Oct. 10, 2023

(54) OPTICAL FIBER CONNECTION COMPONENT AND OPTICAL FIBER CONNECTION STRUCTURE

(71) Applicant: SUMITOMO ELECTRIC INDUSTRIES, LTD., Osaka (JP)

(72) Inventors: Tetsuya Nakanishi, Osaka (JP); Tsutaru Kumagai, Osaka (JP); Hajime Arao, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/755,393

(22) PCT Filed: Oct. 30, 2020

(86) PCT No.: PCT/JP2020/039883
§ 371 (c)(1),
(2) Date: Apr. 28, 2022

(87) PCT Pub. No.: WO2021/095490
PCT Pub. Date: May 20, 2021

(65) Prior Publication Data
US 2022/0413229 A1    Dec. 29, 2022

(30) Foreign Application Priority Data
Apr. 14, 2019  (JP) ................. 2019-206145

(51) Int. Cl.
*G02B 6/38* (2006.01)
*G02B 6/40* (2006.01)
*G02B 6/02* (2006.01)
*G02B 6/26* (2006.01)
*G02B 6/36* (2006.01)

(52) U.S. Cl.
CPC ......... *G02B 6/3854* (2013.01); *G02B 6/3822* (2013.01); *G02B 6/3825* (2013.01);
(Continued)

(58) Field of Classification Search
CPC ........ G02B 6/02; G02B 6/02042; G02B 6/26; G02B 6/36; G02B 6/3822; G02B 6/3825;
(Continued)

(56) References Cited

U.S. PATENT DOCUMENTS 5,975,770 A     11/1999  Yanagi et al.
9,052,475 B2 *  6/2015   Rosenberg ........... G02B 6/4292
(Continued)

FOREIGN PATENT DOCUMENTS

JP    H10-293232 A    11/1998
JP    2004-038005 A    2/2004
(Continued)

OTHER PUBLICATIONS

International Search Report dated Jan. 12, 2021 issued in Patent Application No. PCT/JP2020/039883.

*Primary Examiner* — Ryan A Lepisto
(74) *Attorney, Agent, or Firm* — Pearne & Gordon LLP

(57) ABSTRACT

An optical fiber connecting component includes a glass plate having a plurality of first through holes, a resin ferrule fixed to the glass plate and having a plurality of second through holes that are each coaxial with corresponding one of the plurality of first through holes, and a plurality of optical fibers including a glass fiber and a resin coating that covers the glass fiber. The glass fiber exposed from a tip of each of the optical fibers is held in corresponding one of the first through holes and corresponding one of the second through holes, and a material for the resin ferrule has a flexural modulus of 5 GPa or more at 200° C.

14 Claims, 11 Drawing Sheets

(52) U.S. Cl.
CPC ......... *G02B 6/3829* (2013.01); *G02B 6/3882* (2013.01); *G02B 6/3885* (2013.01); *G02B 6/40* (2013.01); *G02B 6/02* (2013.01); *G02B 6/02042* (2013.01); *G02B 6/26* (2013.01); *G02B 6/36* (2013.01); *G02B 6/3853* (2013.01)

(58) Field of Classification Search
CPC .. G02B 6/3829; G02B 6/3853; G02B 6/3854; G02B 6/3882; G02B 6/3885; G02B 6/40
See application file for complete search history.

(56) References Cited

U.S. PATENT DOCUMENTS

| | | | |
|---|---|---|---|
| 10,809,472 B2 * | 10/2020 | Neukirch | G02B 6/3854 |
| 11,385,405 B2 * | 7/2022 | Yu | G02B 6/125 |
| 2004/0005122 A1 | 1/2004 | Ishii et al. | |
| 2015/0056490 A1 * | 2/2015 | Shimizu | H01M 50/414 429/144 |
| 2018/0156987 A1 * | 6/2018 | Nakanishi | G02B 6/4285 |
| 2018/0321446 A1 | 11/2018 | Arao et al. | |
| 2019/0041586 A1 | 2/2019 | Hosokawa et al. | |
| 2019/0094460 A1 | 3/2019 | Brusberg et al. | |
| 2019/0384024 A1 | 12/2019 | Neukirch et al. | |

FOREIGN PATENT DOCUMENTS

| | | |
|---|---|---|
| JP | 2004-117616 A | 4/2004 |
| JP | 2004-258193 A | 9/2004 |
| JP | 2007-147859 A | 6/2007 |
| JP | 2017-156490 A | 9/2017 |
| WO | 2016-053674 A1 | 4/2016 |
| WO | 2017-073408 A1 | 5/2017 |

* cited by examiner

OPTICAL FIBER CONNECTION COMPONENT AND OPTICAL FIBER CONNECTION STRUCTURE

CROSS REFERENCE TO RELATED APPLICATION

This application claims priority based on Japanese Patent Application No. 2019-206145 filed on Nov. 14, 2019, the entire contents of which are incorporated herein by reference.

BACKGROUND ART

The present disclosure relates to an optical fiber connection component and an optical fiber connection structure.

Patent Document 1 discloses an optical connector including an optical fiber, a ferrule having a flat ferrule end face facing a counterpart optical connector and holding the optical fiber, and a spacer provided on the ferrule end face and defining a gap between the ferrule end face and the counterpart optical connector. According to the optical connector of Patent Document 1, by providing a gap between the optical connectors with a spacer, it is easy to clean the ferrule end face, and even when a plurality of optical fibers is connected at the same time, a large force is not required for the connection, and alignment work is easy.

Patent Document 2 discloses a multi-fiber connector having a plurality of optical fiber insertion holes, and suggests that a liquid crystal polymer or polyphenylene sulfide (PPS) can be used as a resin material forming the multi-fiber connector, in addition to a polyimide-based resin.

Patent Document 3 discloses a resin-made optical path conversion element having a structure in which a fiber is bent and fixed while being positioned.

CITATION LIST

Patent Literature

Patent Document 1: WO 2017/073408 A1
Patent Document 2: JP-A-2004-117616
Patent Document 3: JP-A-2007-147859

SUMMARY OF INVENTION

Means for solving the problem

An optical fiber connecting component according to an aspect of the present disclosure includes: a glass plate having a plurality of first through holes; a resin ferrule fixed to the glass plate and having a plurality of second through holes that are each coaxial with corresponding one of the plurality of first through holes; and a plurality of optical fibers including a glass fiber and a resin coating that covers the glass fiber, wherein the glass fiber exposed from a tip of each of the optical fibers is held in corresponding one of the first through holes and corresponding one of the second through holes, and a material for the resin ferrule has a flexural modulus of 5 GPa or more at 200° C.

DESCRIPTION OF EMBODIMENTS

Figure 1:
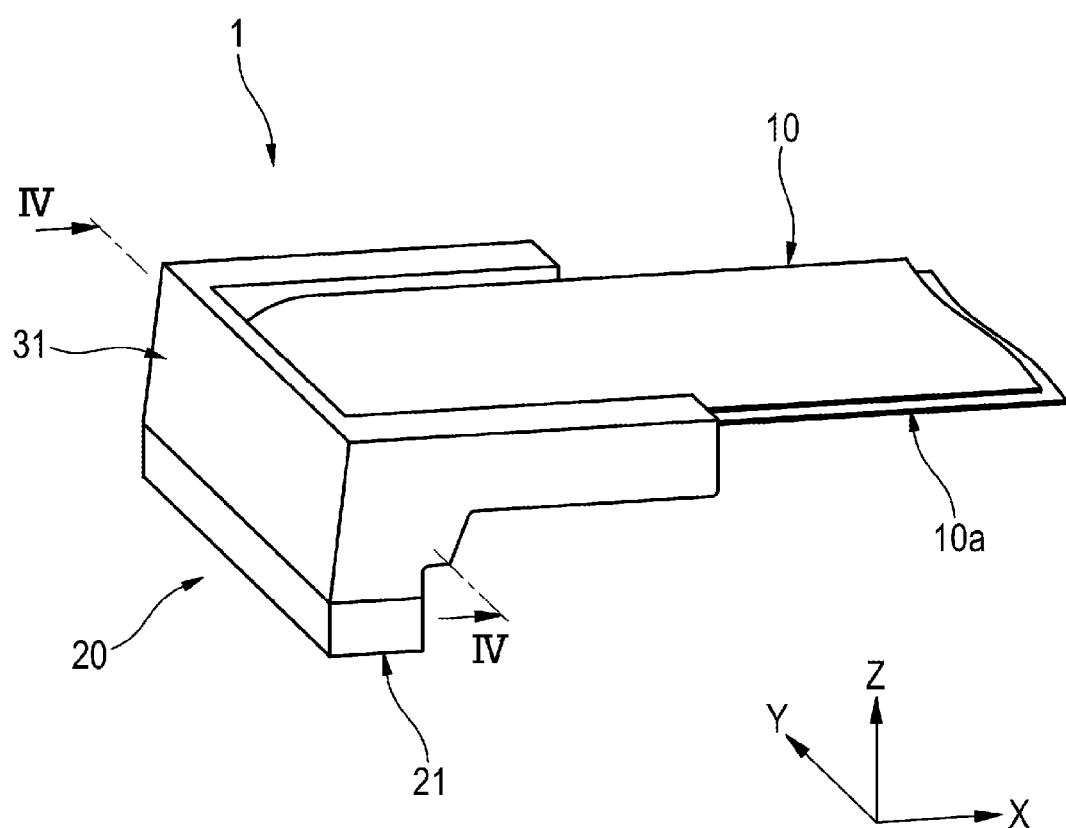
FIG. 1 is an external perspective view illustrating an optical fiber connecting component according to the present disclosure.

[Problems to be Solved by Present Disclosure]

In the optical connector of Patent Document 1, a ferrule formed of a resin material has a structure having a plurality of holes, and thus two dimensional arrangement of optical fibers is possible. However, there is room for improvement in heat resistance.

Patent Document 2 suggests that a liquid crystal polymer having excellent heat resistance is used as an optical connector material. Since the liquid crystal polymer has higher molding anisotropy than PPS generally used for an optical connector, it is difficult to manufacture a ferrule for an optical connector requiring high hole forming accuracy by using only the liquid crystal polymer.

In Patent Document 3, the optical path conversion element is formed of an element main body made of resin and having a block shape with an L-shaped cross section. In a case where the positioning structure of the tip end of the fiber is formed of a resin material, ultraviolet rays cannot be transmitted, and thus, for example, the optical path conversion element and a silicon-photonic integrated circuit (Si-PIC) formed on Si such as silicon photonics cannot be bonded and fixed to each other using a UV adhesive.

An object of the present disclosure is to provide an optical fiber connecting component and an optical fiber connecting structure capable of improving heat resistance and enabling high-definition arrangement of optical fibers.

[Advantageous Effects of Present Disclosure]

According to the present disclosure, it is possible to provide an optical fiber connecting component that improves heat resistance and enables high-definition arrangement of optical fibers.

[Description of Embodiments of the Present Disclosure]

An overview of embodiments of the present disclosure will be described.

(1) An optical fiber connecting component includes a glass plate having a plurality of first through holes, a resin ferrule fixed to the glass plate and having a plurality of second through holes that are each coaxial with corresponding one of the plurality of first through holes, and a plurality of optical fibers including a glass fiber and a resin coating that covers the glass fiber. The glass fiber exposed from a tip of each of the optical fibers is held in corresponding one of the first through holes and corresponding one of the second through holes, and a material for the resin ferrule has a flexural modulus of 5 GPa or more at 200° C. Here, "coaxial" means a positional relationship in which the central axes of the respective objects coincide with each other.

According to the above configuration, since the optical fiber connecting component has heat resistance as a whole and the first through hole can be formed with high definition in the glass plate, for example, highly accurate positioning capable of connecting a single-mode optical fiber can be realized. In addition, since the glass plate fixing the glass fiber can transmit ultraviolet rays, a UV adhesive can be used when an optical fiber connecting component is connected to an optical integrated circuit such as a Si-PIC.

(2) An example of the material is a liquid crystal polymer.

By using a liquid crystal polymer as the resinous material constituting the resin ferrule, the flexural modulus of the resin ferrule can be 5 GPa or more (for example, 10 GPa, 20 GPa, 30 GPa, or 50 GPa) at 200 ° C.

(3) The material preferably has a thermal shrinkage of 0.5% or less (for example, 0.05%, 0.1%, 0.3%, or 0.4%) upon heating from room temperature to a temperature of 200° C. or higher.

When the thermal deformation of the glass plate is large, there is a possibility that the inclination of the connected optical fiber changes and optical loss occurs. On the other hand, according to the above-described configuration, since the resin ferrule having a small thermal shrinkage rate is used, it is possible to suppress deformation of the glass sheet caused by deformation of the resin ferrule. Accordingly, when a plurality of optical fibers fixed to an optical fiber connecting component are connected to a plurality of optical fibers fixed to another optical fiber connecting component, it is possible to suppress the occurrence of optical loss due to the inclination of the connected optical fibers.

(4) It is preferable that the plurality of optical fibers held in the plurality of first through holes and the plurality of second through holes have a variation (standard deviation) in inclination of 0.5 degree or less (for example, 0.3 degrees, 0.1 degrees, 0.01 degrees, or 0.005 degrees). Here, the "inclination of each of the plurality of optical fibers" is an angle between a direction obtained by averaging the directions of the plurality of optical fibers and the direction of each optical fiber.

By setting the variation in the inclination of the aligned optical fibers to be within the above-described range, it is possible to suppress the occurrence of deviation in the direction between the optical axis of the glass fiber and the optical axis of the fiber of the connection partner, and it is possible to realize low-loss connection with the connection partner (for example, an Si-PIC chip).

(5) It is preferable that the glass plate has a front face that has a P-V value (a difference between a maximum value and a minimum value) of 5 µm or less (for example, 0.3 µm, 0.1 µm, 0.01 µm, or 0.005 µm) when the glass plate is heated at 200° C. or higher.

When the thermal deformation of the glass plate is within the above range, the occurrence of light loss can be suppressed.

(6) It is preferable that the plurality of first through holes is two-dimensionally arranged at one section of the glass plate.

According to the above configuration, a larger number of optical fibers can be mounted as compared with the case of using a conventional V-groove substrate, and the fiber mounting density is improved.

(7) It is preferable that the glass fiber protrudes from an end face of the glass plate by 50 nm to 1 µm.

According to the above configuration, the glass fiber and the fiber of the connection partner can be connected by PC (Physical Contact) connection.

(8) It is preferable that the glass plate has a first guiding hole, and the resin ferrule has a second guiding hole that is coaxial with the first guiding hole.

According to the above configuration, by using the first guiding hole and the second guiding hole, positioning of the first through hole of the glass plate and the second through hole of the resin ferrule is facilitated.

(9) It is preferable that the glass fiber has an outer diameter of 100 µm or less (for example, 95 µm, 80 µm, 50 µm, or 40 µm).

According to the above configuration, it is possible to reduce a strain when the optical fiber is bent and fixed within the resin ferrule. Thus, a space-saving optical fiber connecting component having a low overall height can be provided. In addition, it is possible to suppress tensile strain and compressive strain when the glass fiber is bent, and it is also possible to contribute to preventing disconnection of the glass fiber.

(10) It is preferable that each of the plurality of optical fibers is a multi-core optical fiber the glass fiber of which includes a plurality of cores and a cladding that surrounds the plurality of cores.

According to the above configuration, an optical fiber connecting component having a high core density can be realized.

(11) In the optical fiber connection structure of the present disclosure, a first optical fiber connecting component serving as the optical fiber connecting component according to any one of Item (1) to Item (10) and a second optical fiber connecting component fixed to the first optical connecting component and having a plurality of optical fibers in an arrangement corresponding to an arrangement of the plurality of optical fibers in the first optical fiber connecting component are connected. A first end face of the first optical fiber connecting component and a second end face of the second optical fiber connecting component are faces inclined with respect to an optical axis of the plurality of optical fibers, and a gap of 30 µm or less is formed between the first end face and the second end face.

According to the above-described configuration, favorable optical connection is possible, and additional processing for protruding the glass fiber from the end face of the glass plate is unnecessary.

(12) It is preferable that the second optical fiber connecting component is the optical fiber connecting component according to any one of Item (1) to Item (10), a spacer for forming the gap is provided at an end face of the glass plate of at least one of the first optical fiber connecting component and the second optical fiber connecting component.

(13) It is preferable that the second optical fiber connecting component is provided by mounting the plurality of optical fibers in a resin ferrule, and a spacer for forming the gap is provided at an end face of the second optical fiber connecting component.

(14) It is preferable that the optical fiber connection structure further includes an adapter, the adapter fitting to the first optical fiber connecting component and the second optical connecting component so as to connect the first optical fiber connecting component and the second optical fiber connecting component, the second optical fiber connecting component is the optical fiber connecting component according to any one of Item (1) to Item (10) or a component provided by mounting the plurality of optical fibers in a resin ferrule, and a spacer for forming the gap is provided in the adapter of the optical fiber connecting structure.

It is preferable that a spacer for providing a gap between the first end face and the second end face is provided in the configuration of any one of Items (12) to (14).

[Details of Embodiments of the Present Disclosure]

Hereinafter, embodiments of the present disclosure will be described with reference to the drawings. Members having the same reference numerals as those already described in the description of the present embodiment will not be described for convenience of description. In addition, the dimensions of each member illustrated in the drawings may be different from the actual dimensions of each member for convenience of description.

In addition, in the description of the present embodiment, in order to facilitate understanding of the present embodiment, an X-axis, a Y-axis, and a Z-axis orthogonal to each other are referred to as appropriate. These directions are relative directions set in an optical fiber connecting component 1 illustrated in FIG. 1. Therefore, along with the rotation of optical fiber connecting component 1, the X-axis, the Y-axis, and the Z-axis are also rotated.

First Embodiment

Figure 2:
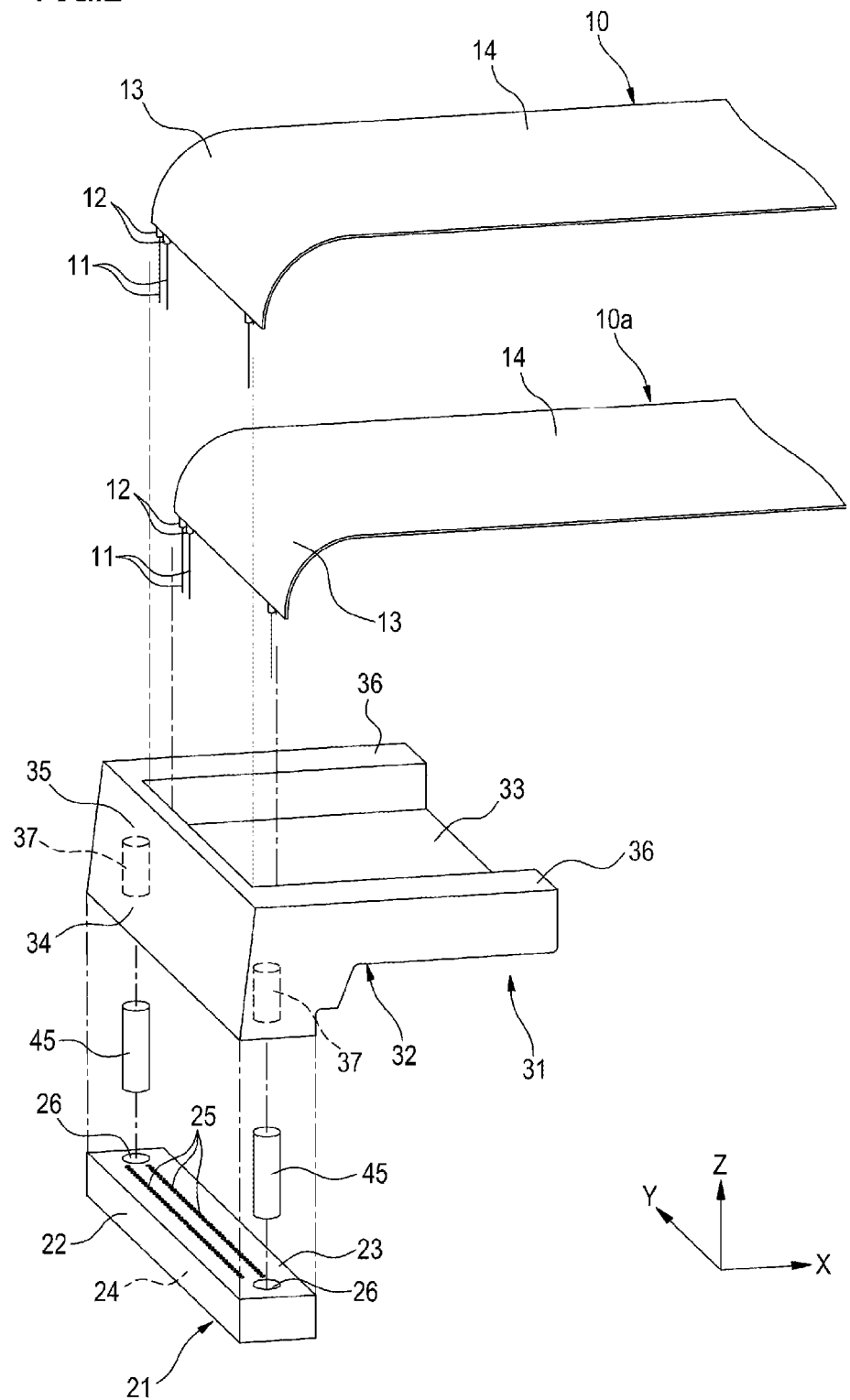
FIG. 2 is an exploded perspective view of the optical fiber connecting component of FIG. 1.
Figure 3:
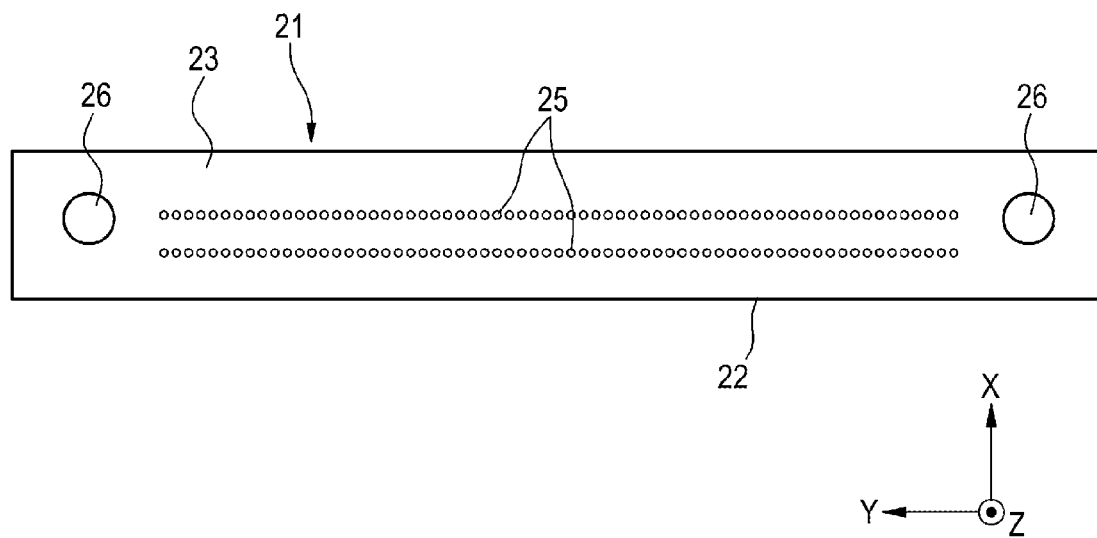
FIG. 3 is a view illustrating a front face of a multi-hole glass plate included in the optical fiber connecting component of FIG. 1.
Figure 4:
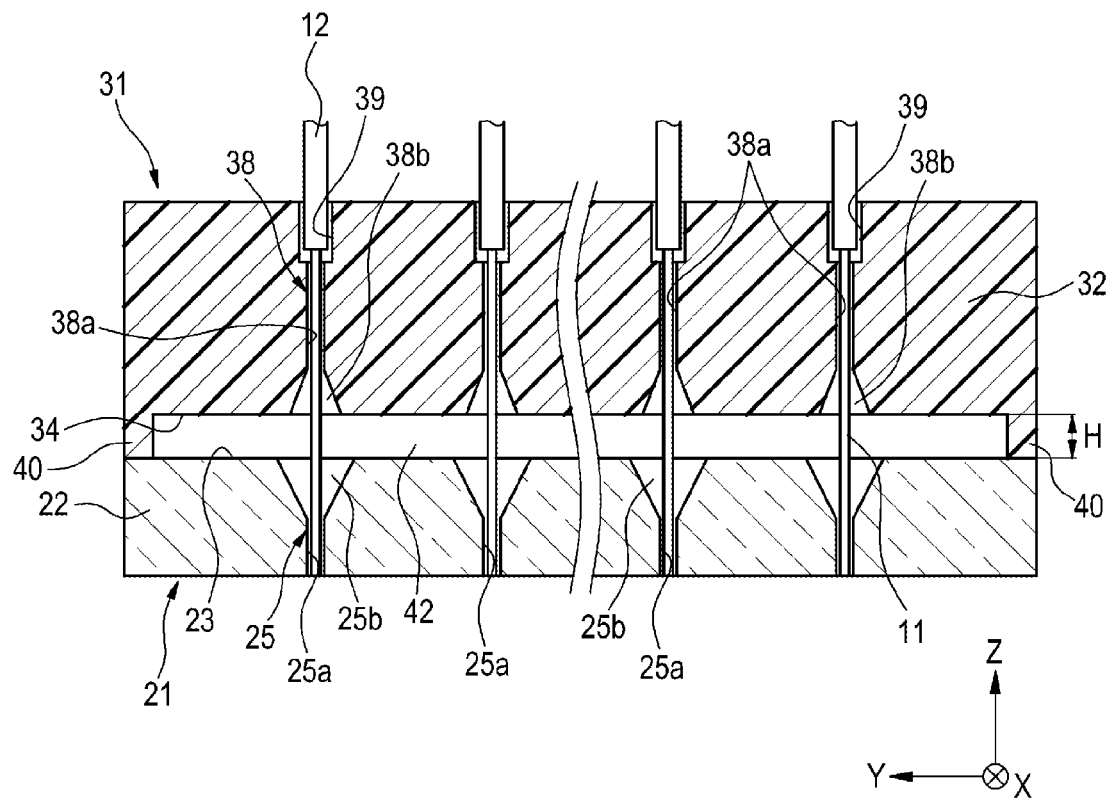
FIG. 4 is a cross-sectional view taken along line IV-IV of the optical fiber connecting component illustrated in FIG. 1.
Figure 5:
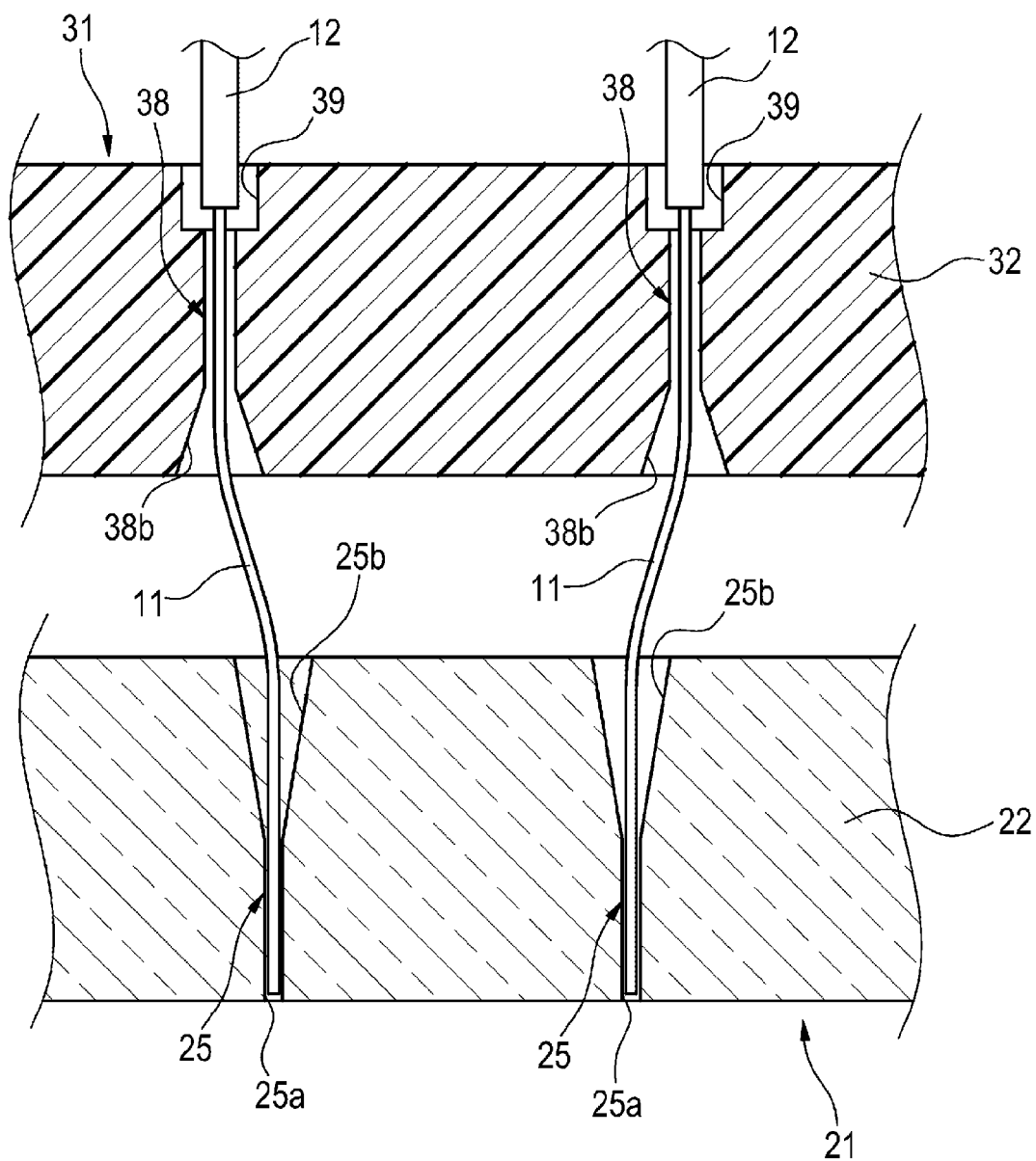
FIG. 5 is a conceptual diagram for explaining a glass fiber disposed between a glass plate and a resin ferrule in the optical fiber connecting component of FIG. 1.

Optical fiber connecting component 1 according to the first embodiment will be described below with reference to FIGS. 1 to 5. FIG. 1 is an external perspective view illustrating optical fiber connecting component 1. FIG. 2 is an exploded perspective view of optical fiber connecting component 1 of FIG. 1. FIG. 3 is a view illustrating a front face of a glass plate included in optical fiber connecting component 1 illustrated in FIG. 1. FIG. 4 is a cross-sectional view taken along line IV-IV of optical fiber connecting component 1 illustrated in FIG. 1. FIG. 5 is a conceptual diagram for explaining a glass fiber disposed between a glass plate and a resin ferrule in optical fiber connecting component 1 of FIG. 1 in relation to FIG. 4. Optical fiber connecting component 1 is used to optically connect, for example, an electronic substrate including an optical integrated circuit chip or the like and a local wiring (or an external transmission line).

As illustrated in FIG. 1, optical fiber connecting component 1 includes optical fibers 10 and optical fibers 10a arranged side by side with optical fibers 10. Each of the optical fibers 10 and 10a has, for example, a bending portion (bending portion 13) in the middle thereof. One end of optical fibers 10 and 10a is fixed to an electronic substrate via a fiber fixing part 20, and the other end of optical fibers 10 and 10a is connected to a local wiring via a connector (not illustrated).

As shown in FIG. 2, optical fibers 10 and 10a includes a plurality of glass fibers 11 arranged along the Y direction shown in the drawing. Each of the glass fibers 11 includes a core made of silica-based glass and a cladding surrounding the core. The outer diameter of glass fibers 11 is, for example, 100 μm or less. Optical fibers 10 and 10a may be a single-core optical fiber including a glass fiber having a single core and a cladding surrounding the single core, or may be a multi-core optical fiber including a glass fiber having a plurality of cores and a cladding collectively surrounding the plurality of cores.

An individual coating resin layer 12 is provided on the outside of each of glass fibers 11. In addition, the periphery of individual coating resin layer 12 is covered with a collective coating resin layer 14 behind bending portion 13 of glass fibers 11 (in the positive direction of X illustrated in the drawing).

Note that glass fibers 11 are desirably a low bending loss fiber in order to be able to cope with a flexible bending shape. For a low bending loss fiber, preferable is a fiber in which confinement of light to the core is strengthened by applying a structure in which the refractive index of the core is increased or a refractive index structure called a trench structure. The composition of glass fibers 11 can be prepared by adding a dopant for appropriately controlling the refraction index using $SiO_2$ glass. For example, the core may be made of $SiO_2$ glass to which $GeO_2$ is added or $SiO_2$ glass to which $GeO_2$ and F are co-added. The cladding may be made of pure $SiO_2$ glass or $SiO_2$ glass doped with fluorine. This makes it possible to obtain an optical fiber that is economical and has good shape controllability.

In addition, in order to increase the strength of the optical fiber, it is possible to suitably combine a method of performing carbon coating on the outer periphery of glass fibers 11, a method of applying compressive strain to the outer periphery of glass fibers 11 by adjusting thermal history during drawing, or the like. Bent optical fibers 10 and 10a illustrated in FIG. 1 may be heated and bent in advance. In this case, glass fibers 11 in bending portion 13 are exposed before heating. As the heating means, a burner, a $CO_2$ laser, an arc discharge, a heater or the like can be used.

Since the $CO_2$ laser can easily adjust the irradiation intensity, the irradiation range, and the irradiation time, it has advantageous characteristics for precise control of the distribution of curvatures. In the vicinity of 10 μm, which is a typical wavelength of a $CO_2$ laser, since glass is opaque, it is considered that the irradiation energy of the $CO_2$ laser is absorbed by the surface layer of glass fibers 11 and is transmitted by re-radiation and thermal conduction. If the power of the $CO_2$ laser is too high, the surface layer temperature of glass fibers 11 rises sharply to the temperature at which the glass evaporates, and the shape cannot be maintained. For this reason, the irradiation power of the $CO_2$ laser is appropriately adjusted so that the glass in the surface layer of glass fibers 11 does not evaporate and the cross section of the heated glass fibers 11 rises to a temperature equal to the working point ($10^4$ dPa·sec) or more for a predetermined time to remove the strain. It is desirable that the cooling rate of the temperature of glass fibers 11 when bent by the $CO_2$ laser is $10^{4°}$ C./s or less, and glass fibers 11 are cooled slowly in order to remove distortion.

Fiber fixing part 20 includes a multi-hole glass plate 21 (an example of a glass plate) and a multi-hole resin ferrule 31 (an example of a resin ferrule). As illustrated in FIG. 2, multi-hole glass plate 21 has a glass plate main body 22 having, for example, a rectangular parallelepiped shape. Glass plate main body 22 is transparent to ultraviolet rays. A rectangular front face 23 of glass plate main body 22 is disposed to face a rear face 34 of multi-hole resin ferrule 31.

A rectangular rear face 24 of glass plate main body 22 is disposed to face the electronic substrate.

The thickness between front face 23 and rear face 24 of glass plate main body 22 (the width in the Z direction in the drawing) is as thin as 1mm, for example, and glass plate main body 22 has a plurality of first through holes 25 penetrating through front face 23 and rear face 24. As illustrated in FIG. 3, the plurality of first through holes 25 are, for example, two dimensionally arranged along the width direction (Y direction in the drawing) and the length direction (X direction in the drawing) of glass plate main body 22. Glass fibers 11 are held in first through holes 25.

First through holes 25 can be formed by, for example, a process in which photolithography and dry etching such as reactive ion etching (RIE) are combined, or a drilling technique using a laser. For example, the positional accuracy of first through holes 25 is preferably ±1 μm or less. Note that the technique is not limited to the above-described technique as long as the technique is a glass hole forming technique capable of realizing that the position of first through holes 25 has an error of 1 μm or less with respect to a predetermined design position and the inner diameter of first through holes 25 is ±1 μm or less with respect to a predetermined diameter. In this example, an example in which glass plate main body 22 has a plurality of first through holes 25 has been described, but the number of first through holes may be one.

Guiding holes 26 are provided in the vicinity of both ends of glass plate main body 22 when viewed in the Y direction illustrated in the drawing. As illustrated by a broken line in FIG. 2, multi-hole resin ferrule 31 has guiding holes 37 at positions corresponding to guiding holes 26 of glass plate main body 22. By inserting guide pins 45 into guiding holes 26 of glass plate main body 22 and guiding holes 37 of multi-hole resin ferrule 31, respectively, first through holes 25 and second through holes 38 of multi-hole resin ferrule 31, which will be described with reference to FIG. 4, can be easily aligned in a coaxial relationship.

Guide pins 45 may be pulled out from multi-hole glass plate 21 and multi-hole resin ferrule 31 after multi-hole glass plate 21 and multi-hole resin ferrule 31 are fixed. This is because if guide pins 45 are left without being pulled out, multi-hole glass plate 21 may be damaged if the difference between the thermal expansion coefficient of multi-hole glass plate 21 and the thermal expansion coefficient of multi-hole resin ferrule 31 is large.

As illustrated in FIG. 1, multi-hole resin ferrule 31 has a ferrule main body 32 that is substantially L-shaped in a side view, and is placed on multi-hole glass plate 21. As illustrated in FIG. 2, ferrule main body 32 has a front face 33 on which optical fibers 10a can be placed, and rear face 34 disposed on one end side of front face 33 so as to face front face 23 of glass plate main body 22. A front wall 35 facing bending portion 13 of optical fibers 10 and 10a is provided at one end of front face 33 of ferrule main body 32. In addition, sidewalls 36 are provided on the sides of front face 33 of ferrule main body 32 so as to face the side ends of optical fibers 10 and 10a.

As illustrated in FIG. 4, the height (the height in the Z direction in the drawing) of ferrule main body 32 from front face 33 to rear face 34 is greater than the height (1 mm) of glass plate main body 22 from front face 23 to rear face 24. Ferrule main body 32 has a plurality of second through holes 38 passing through front face 33 and rear face 34. As well as the first through holes 25, the second through holes 38 are two dimensionally arranged along the width direction (the Y direction in the drawing) and the length direction (the X direction in the drawing) of ferrule main body 32. As well as in the first through holes 25, the glass fibers 11 are held in the second through holes 38.

Second through holes 38 have, near front face 33 of ferrule main body 32, fiber holding holes 39 in which individual coating resin layer 12 of the optical fibers can be loosely fitted. The outer diameters of first through holes 25 and second through holes 38 are larger than the outer diameter of glass fibers 11 exposed from the distal end of the optical fibers.

In the present embodiment, an example of multi-hole resin ferrule 31 having the substantially L-shaped ferrule main body 32 has been described. However, various shapes can be adopted for portions other than rear face 34 disposed to face front face 23 of glass plate main body 22. The multi-hole resin ferrule is not limited to the shape applicable to the bent optical fibers illustrated in FIG. 1, for example, and may be a shape applicable to linear optical fibers that are not bent.

As illustrated in FIG. 4, ferrule main body 32 has a protrusion 40 protruding toward glass plate main body 22 at an outer peripheral portion of rear face 34. Protrusion 40 is fixed in contact with front face 23 of multi-hole glass plate 21, so that the opening of first through holes 25 located on front face 23 of multi-hole glass plate 21 and the opening of second through holes 38 located on rear face 34 of multi-hole resin ferrule 31 are spaced apart from each other by a predetermined distance (indicated by H in FIG. 4). For example, an air gap 42 is present around glass fibers 11 located between front face 23 of multi-hole glass plate 21 and rear face 34 of multi-hole resin ferrule 31 or in a region between adjacent glass fibers 11 excluding the periphery of glass fibers 11. Note that the region between the adjacent glass fibers 11 excluding the periphery of the glass fibers 11 may be filled with resins having a Young modulus of 100 MPa or less.

Meanwhile, if the front face of the multi-hole glass plate and the rear face of the multi-hole resin ferrule are brought into contact with each other without a gap, a shear force may be applied to the glass fiber in accordance with a temperature change due to a difference between a thermal expansion coefficient of the multi-hole glass plate and a thermal expansion coefficient of the multi-hole resin ferrule, and the glass fiber may be broken.

On the other hand, in the present embodiment, front face 23 of multi-hole glass plate 21 and rear face 34 of multi-hole resin ferrule 31 are spaced apart from each other by a predetermined distance H, thereby allowing glass fibers 11 to be bent. Therefore, as illustrated in FIG. 5, even when the position of first through holes 25 of multi-hole glass plate 21 and the position of second through holes 38 of multi-hole resin ferrule 31 corresponding to first through holes 25 are displaced with a change in temperature, a shear force is hardly applied to glass fibers 11. Therefore, it is possible to prevent disconnection of glass fibers 11 between first through holes 25 and second through holes 38. In addition, since the outer diameters of first through holes 25 and second through holes 38 are larger than the outer diameter of glass fibers 11, even if the temperature of optical fiber connecting component 1 changes in the range of −40° C. to 85° C., which is usually used, contact between first through holes 25 and second through holes 38 and glass fibers 11 can be easily avoided, which also contributes to prevention of disconnection of glass fibers 11.

First through holes 25 provided in glass plate main body 22 have a straight portion 25a for holding glass fibers 11 and a tapered portion 25b whose diameter increases toward front face 23 of glass plate main body 22. Similarly, second through holes 38 provided in ferrule main body 32 have a straight portion 38a for holding glass fibers 11 and a tapered portion 38b whose diameter increases toward rear face 34 of ferrule main body 32. By providing the tapered portions 25b and 38b in this manner, as illustrated in FIG. 5, the distance between the opening of first through holes 25 and the opening of second through holes 38 is larger than the distance H from front face 23 of glass plate main body 22 to rear face 34 of the rule main body 32 by the tapered portions 25b and 38b. Therefore, the shearing force applied to glass fibers 11 can be further reduced.

As a resin material constituting multi-hole resin ferrule 31, for example, a liquid crystal polymer is preferably used. As liquid crystal polymers, the following examples may be mentioned.

(1) a polycondensate of ethylene terephthalate and p-hydroxybenzoic acid;

[Chemical Formula I]

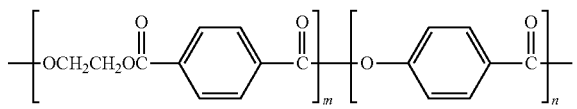

(2) a polycondensate of phenol, phthalic acid (for example, 4, 4-dihydroxybiphenol, terephthalic acid), and parahydroxybenzoic acid;

[Chemical Formula 2]

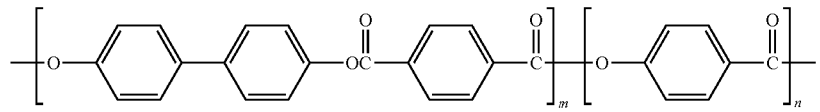

(3) a polycondensate of polyarylate, for example, 2, 6-hydroxynaphthoic acid and parahydroxybenzoic acid;

[Chemical Formula 3]

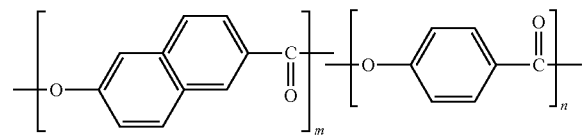

It is desirable that an inorganic filler is kneaded into the liquid crystal polymer in order to improve anisotropy and low weld strength. As the inorganic filler, a spherical or fibrous glass filler can be preferably used.

Since the liquid crystal polymer has a glass transition point of 90° C. or higher, it is not denatured in a region of −40° C. to +85° C. in which optical fiber connecting component 1 is usually used, and has high durability against humidity. In addition, by using the above-described liquid crystal polymer as the resinous material of multi-hole resin ferrule 31, it is possible to achieve a flexural modulus of multi-hole resin ferrule 31 of 5 GPa or more at 200° C., more preferably 5 GPa or more at 260° C.

The liquid crystal polymer has good fluidity and is relatively easy to mold. Since multi-hole resin ferrule 31 using the liquid crystal polymer can be formed into various shapes, it is possible to easily meet the requirements for optical fiber connecting component 1 such as changing the optical path direction and reducing the height of optical fiber connecting component 1.

Figure 6:
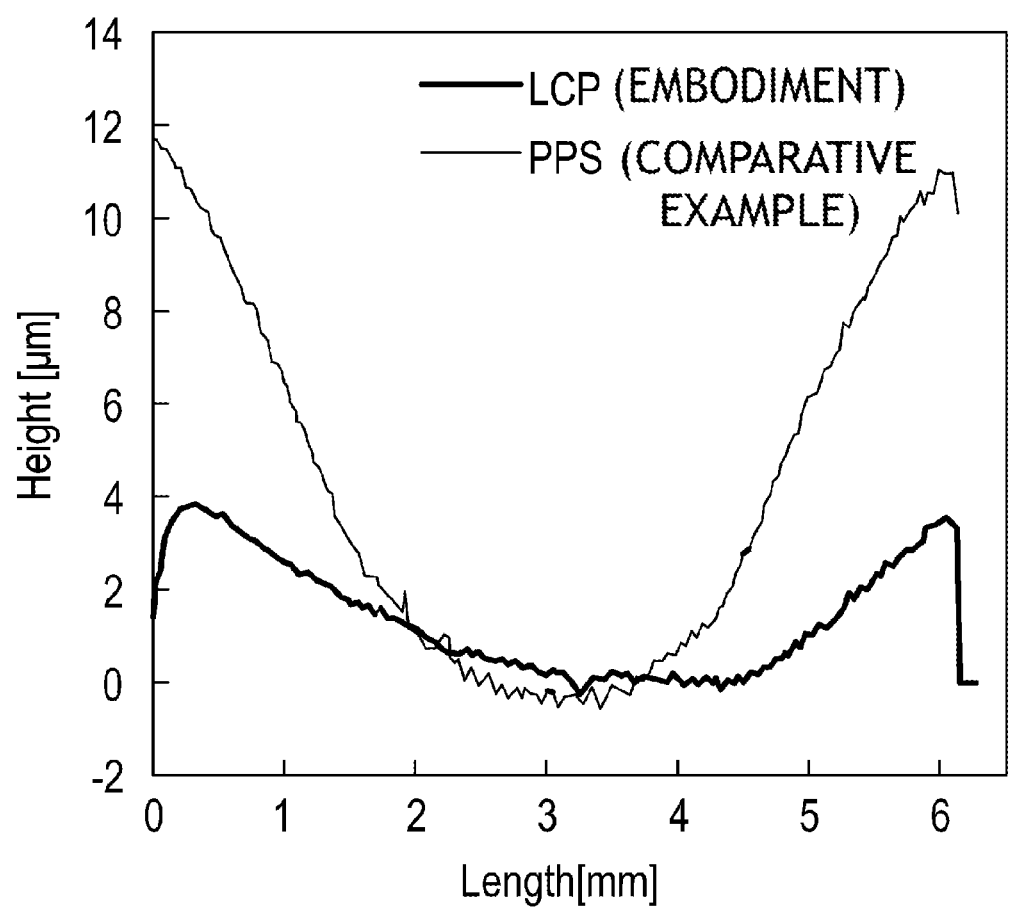
FIG. 6 is a graph showing deformation of a resin ferrule according to an example and a resin ferrule according to a comparative example when heat treatment is performed.

FIG. 6 is a graph showing deformation of a multi-hole resin ferrule according to an embodiment made of a liquid crystal polymer (LCP) and a multi-hole resin ferrule according to a comparative example made of polyphenylene sulfide (PPS), which is a conventional material, when heat treatment is performed at 260° C. for 5 minutes. FIG. 6 is a graph showing the unevenness of the end face of the resin ferrule according to the example and the comparative example.

As shown in FIG. 6, in the comparative example using PPS, the unevenness of the end face of the multi-hole resin ferrule was 12 μm or more in P-V (Peak-Valley) value. Since PPS, which is an existing resin ferrule material, has a glass transition point of about 90° C., deformation after heat treatment is large. When a multi-hole glass plate is attached to such a resin material having large thermal deformation and heat treatment is performed, large deformation is also given to the multi-hole glass plate after heat treatment. Here, the P-V value is a sum of a distance from an average plane approximating the end face of the multi-hole resin ferrule to a most protruding point and a most recessed point. The end face shape of the multi-hole resin ferrule can be obtained by using an optical surface roughness/shape measuring machine using an interference microscope, and the average plane can be determined from the end face shape by using a least square method.

On the other hand, in the example using the liquid crystal polymer, the unevenness of the end face of the multi-hole resin ferrule was 5 μm or less in P-V value. It was confirmed that, by using a liquid crystal polymer having excellent heat resistance as a resin ferrule material, even when heat treatment is performed at a general reflow temperature of 260° C., thermal deformation can be significantly suppressed as compared with PPS. Specifically, by using the liquid crystal polymer, it is possible to suppress the thermal shrinkage of the multiple-hole resin ferrule to 0.5% or less upon heating from room temperature (for example, 20° C.) to a temperature of 200° C. or higher, preferably from room temperature to 260° C. or higher.

Figure 7:
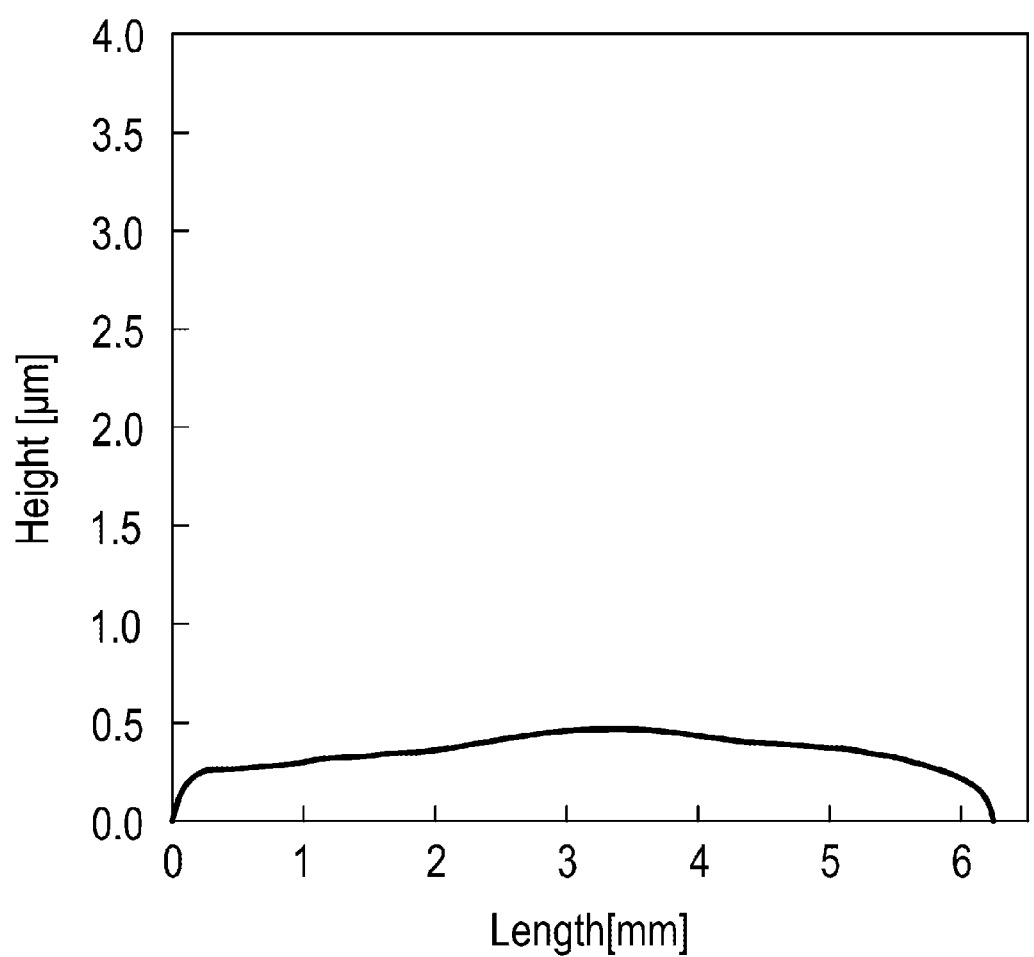
FIG. 7 is a graph showing deformation of a multi-hole glass plate when an optical fiber connecting component using a resin ferrule according to an embodiment is heat-treated.

FIG. 7 is a graph showing deformation of a multi-hole glass plate when an optical fiber connecting component including a multi-hole resin ferrule and a multi-hole glass plate using a liquid crystal polymer according to an embodiment is heat-treated at 260° C. for 5 minutes. As shown in FIG. 7, the unevenness of the end face of the multi-hole glass plate after the heat treatment was about 0.5 μm in terms of P-V value, and it was possible to achieve 5 μm in terms of P-V value and preferably 1 μm in terms of P-V value, which are deformation amount sufficiently allowable for securing the positional accuracy of the fiber.

As described above, optical fiber connecting component 1 according to this embodiment includes multi-hole glass plate 21 having a plurality of first through holes 25, multi-hole resin ferrule 31 fixed to multi-hole glass plate 21 and having a plurality of second through holes 38 coaxial with the first through holes 25, and a plurality of optical fibers 10 and 10a including glass fibers 11 held in first through holes 25 and second through holes 38. Multi-hole resin ferrule 31 is made of a resinous material having a flexural modulus of elasticity of 5 GPa or more at 200° C. In order to realize a flexural modulus of 5 GPa or more at 200° C., a liquid crystal polymer is used as a resinous material constituting multi-hole resin ferrule 31. As a result, the heat resistance of entire optical fiber connecting component 1 can be improved. In addition, by using multi-hole resin ferrule 31 that can have a flexible shape, it is possible to protect optical fibers 10 and 10a and fix the bent shape.

Further, since the positioning structure for the optical integrated circuit is formed by multi-hole glass plate 21, the position and diameter of the long through-hole can be formed with high accuracy. Therefore, first through holes 25 can be arranged two dimensionally with respect to multi-hole glass plate 21, and optical fiber connecting component 1 with high-channel-density can be obtained. In particular, when the size of multi-hole glass plate 21 is S and the number of mounted fibers is n, it is possible to obtain a high-channel-density optical fiber connecting component 1 in which n/S exceeds $10/mm^2$. In addition, as described above, since multi-hole glass plate 21 is transparent to ultraviolet rays, multi-hole glass plate 21 can be fixed to an electronic substrate, for example, an optical integrated circuit such as an Si-PIC by using a UV adhesive.

Meanwhile, when thermal deformation of the multi-hole glass plate is large, optical loss may occur in coupling between a glass fiber included in an optical fiber connecting component and a silicon photonics chip (SiPH chip). The deformation of the multi-hole glass plate becomes a significant problem particularly when realizing a multi-channel optical fiber connecting component of 100 ch or more that requires an increase in the size of the multi-hole glass plate. However, the thermal deformation of the multi-hole glass plate is not caused by the glass plate itself, but is mainly caused by the thermal deformation of the multi-hole resin ferrule.

On the other hand, in optical fiber connecting component 1 according to this embodiment, multi-hole resin ferrule 31 made of a liquid crystal polymer which is a resin material having a thermal shrinkage of 0.5% or less upon heating from room temperature to 200° C. or higher, preferably from room temperature to 260° C. or higher is used. Therefore, thermal deformation can be significantly suppressed as compared with the existing multi-hole resin ferrule using PPS. By suppressing the thermal deformation of multi-hole resin ferrule 31, the deformation amount of multi-hole glass plate 21 after heat treatment is also suppressed to 5 μm or less, preferably 1 μm or less in terms of P-V value. Therefore, the deviation in direction between the optical axis of glass fibers 11 and the optical axis of the fibers to be connected, that is, the coupling angle difference between the channels, can be maintained at a substantially negligible level.

According to the present embodiment, since the deformation amount of multi-hole glass plate 21 after the heat treatment is small, the variation in inclination (angular variation) of glass fibers 11 fixed to multi-hole glass plate 21 is 0.5 degrees or less. As a result, the difference in coupling angle between glass fibers 11 and the SiPh chip is suppressed, and the occurrence of optical loss can be suppressed. As a result, it is possible to suppress a decrease in coupling efficiency between the grating coupler, which is generally used as a front face coupling method of the SiPh chip, and optical fibers 10 and 10a.

In the present embodiment, optical fibers 10 and 10a may be a multi-core optical fiber including glass fiber 11 having a plurality of cores and a cladding surrounding the plurality of cores. By applying the multi-core optical fiber, for example, it is possible to cope with a form in which high-density input/output of light, specifically exceeding 100 ch from one Si-PIC. is required.

(First Modification)

Figure 8:
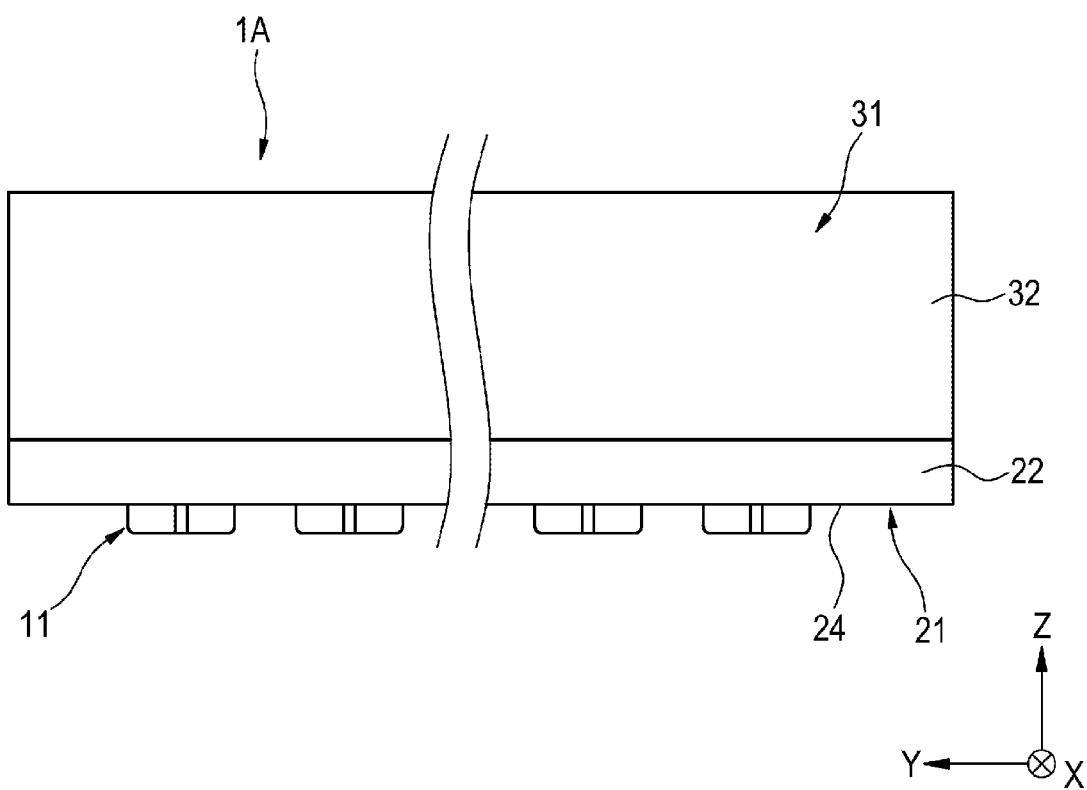
FIG. 8 is a front view of an optical fiber connecting component according to a first modification.

FIG. 8 is a front view of an optical fiber connecting component 1A according to a first modification. As in optical fiber connecting component 1A illustrated in FIG. 8, glass fibers 11 held in first through holes 25 of multi-hole glass plate 21 may protrude from rear face 24 of multi-hole glass plate 21. In this case, the protrusion amount of glass fibers 11 from rear face 24 of multi-hole glass plate 21 is, for example, about 50 nm to 1 μm. As described above, since glass fibers 11 protrudes from rear face 24 of multi-hole glass plate 21, an end face of glass fibers 11 can be connected to glass fibers protruding from an optical connector on a connection partner side by physical contact (PC). However, since the composition of multi-hole glass plate 21 used in the present embodiment is substantially the same as that of glass fibers 11, it is difficult to protrude glass fibers 11 from multi-hole glass plate 21 by a typical polishing process used in a conventional resin ferrule. Therefore, in order to protrude glass fibers 11, additional processing such as laser processing or etching processing of rear face 24 of multi-hole glass plate 21 is required.

(Second Modification)

In the above-described first embodiment, an example of a state in which first through holes 25 extend in the vertical direction (the Z direction in the drawing) with respect to rear face 24 (and front face 23) of glass plate main body 22 has been described, but the present invention is not limited to this example.

Figure 9:
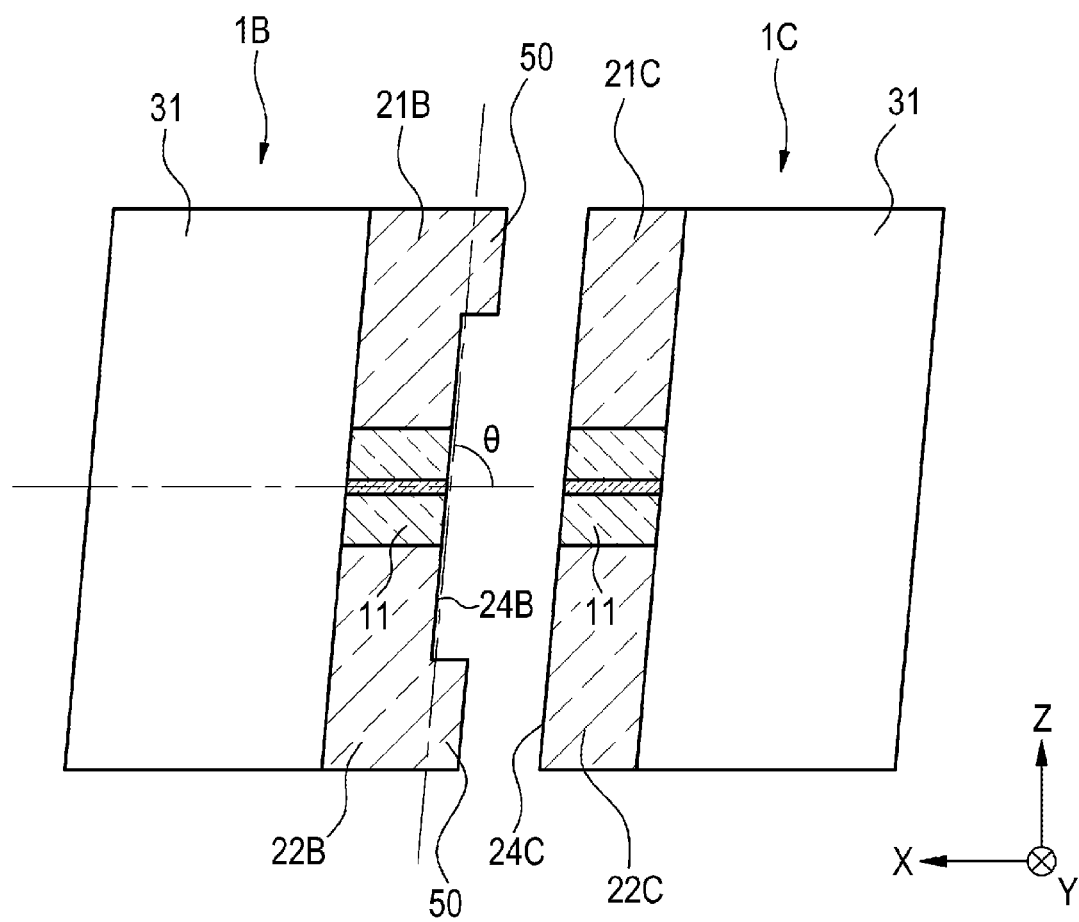
FIG. 9 is a diagram illustrating an optical fiber connecting component according to a second modified example.

FIG. 9 is a conceptual diagram illustrating an optical fiber connecting component according to a second modified example. FIG. 9 illustrates an optical fiber connecting component 1B and an optical fiber connecting component 1C that is a connection partner of optical fiber connecting component 1B. In FIG. 9, for the sake of explanation, only glass plate main bodies 22B and 22C and the portion of glass fibers 11 held by glass plate main bodies 22B and 22C are illustrated as cross-sectional views.

Figure 10:
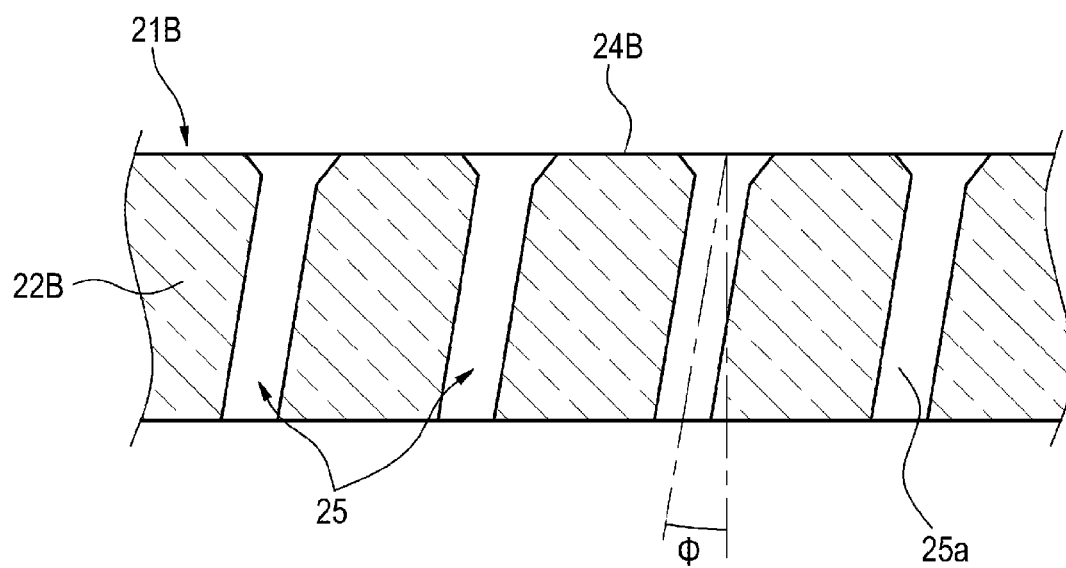
FIG. 10 is a schematic cross-sectional view illustrating a glass plate main body included in the optical fiber connecting component of FIG. 9.

In optical fiber connecting component 1B illustrated in FIG. 9, a rear face 24B (an example of a first end face) of a multi-hole glass plate 21B is an inclined surface that is not perpendicular to the optical axis of glass fibers 11. Specifically, it is preferable that the angle θ formed by the optical axis of glass fibers 11 and rear face 24B of multi-hole glass plate 21B is 75 degrees or more and 85 degrees or less. For example, as illustrated in FIG. 10, multi-hole glass plate 21B has straight portion 25a that is a part of first through holes 25 and is inclined at a certain angle with respect to a line perpendicular to rear face 24B of glass plate main body 22B. Specifically, an angle φ formed by a line perpendicular to rear face 24B of glass plate main body 22B and straight portion 25a of first through holes 25 is preferably 8 degrees.

As well as optical fiber connecting component 1B, a rear face 24C (an example of a second end face) of a multi-hole glass plate 21C included in optical fiber connecting component 1C as a connection partner is an inclined surface that is not perpendicular to the optical axis of glass fibers 11. Optical fiber connecting component 1C is a component having the same configuration as optical fiber connecting component 1B, and both the optical fiber connecting components 1B and 1C are fixed to each other in a state where rear face 24B of multi-hole glass plate 21B of optical fiber connecting component 1B and rear face 24C of multi-hole glass plate 21C of optical fiber connecting component 1C are parallel to each other.

In addition, in order to provide a gap between rear face 24B of optical fiber connecting component 1B and rear face 24C of optical fiber connecting component 1C, as illustrated in FIG. 9, rear face 24B of one of the optical fiber connecting components 1B and 1C has a spacer 50. In a state where optical fiber connecting component 1B and optical fiber connecting component 1C are fixed, the gap formed between the end face of glass fibers 11 of optical fiber connecting component 1B and the end face of glass fibers 11 of optical fiber connecting component 1C is defined by the film thickness of spacer 50. The thickness of spacer 50 is, for example, 30 μm or less, or preferably 20 μm or less. In this way, glass fibers 11 of optical fiber connecting component 1B and glass fibers 11 of optical fiber connecting component 1C are disposed so as to face each other via the gap formed between the optical fiber connecting components 1B and 1C, whereby the glass fibers 11 are optically connected to each other.

Like glass plate main body 22B of multi-hole glass plate 21B, it is preferable that spacer 50 also has heat resistance. Therefore, spacer 50 can be formed by, for example, welding a thin film formed of a liquid crystal polymer or Teflon (registered trademark) on glass plate main body 22B. Alternatively, spacer 50 may be formed by selectively etching a portion of multi-hole glass plate 21B including glass fibers 11 to partially form a concave shape.

As described above, optical fiber connecting components 1B and 1C according to the second modification are configured such that rear faces 24B and 24C of multi-hole glass plates 21B and 21C are inclined surfaces that are not perpendicular to the optical axis of glass fibers 11, and a gap of 30 μm or less is provided between rear face 24B of optical fiber connecting component 1B and rear face 24C of optical fiber connecting component 1C to bring them close to each other. Thus, glass fibers 11 can be optically connected to each other without performing PC connection, and low-loss connection can be performed while suppressing Fresnel reflection loss. Although the inclination angles of rear faces 24B and 24C of glass plate main bodies 22B and 22C differ depending on the type of optical fiber used, the insertion loss of the optical fiber is 0.5 dB or less and the reflection loss is 40 dB or more (reflectivity 0.0001 or less) when a general single-mode optical fiber is used and θ=82° and the gap between optical fiber connecting components 1B and 1C, i.e., the height of spacer 50, is 20 μm.

(Third Modification)

Figure 11:
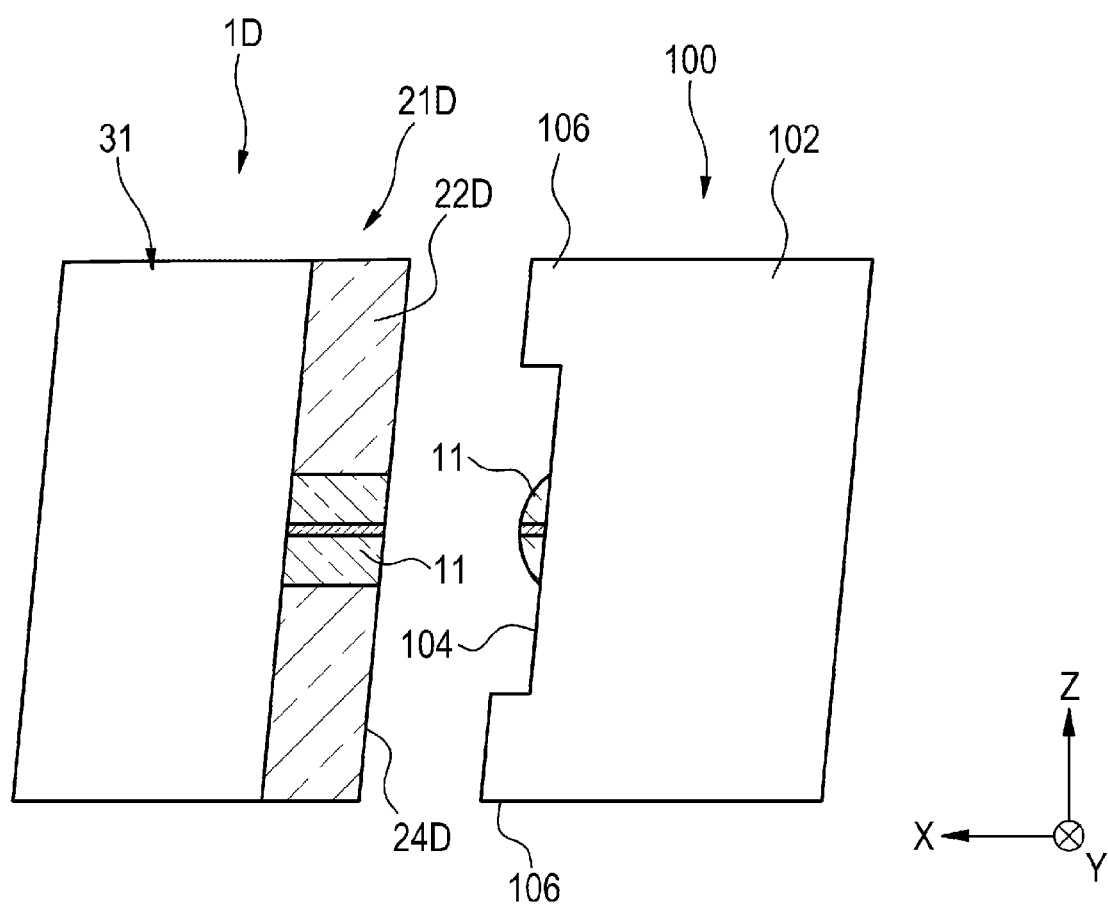
FIG. 11 is a diagram illustrating an optical fiber connecting component according to a third modified example.

In the second modified example illustrated in FIG. 9, an example in which spacer 50 is provided in glass plate main body 22B of one optical fiber connecting component 1B of optical fiber connecting components 1B and 1C constituted by a multi-hole glass plate and a multi-hole resin ferrule has been described, but the present invention is not limited to this example. FIG. 11 is a conceptual diagram illustrating an optical fiber connecting component according to a third modified example. FIG. 11 illustrates an optical fiber connecting component 1D and an optical connector 100 to which optical fiber connecting component 1D is connected.

Similar to optical fiber connecting components 1B and 1C according to the second modification, a rear face 24D of a multi-hole glass plate 21D (a glass plate main body 22D) included in optical fiber connecting component 1D according to the third modification is an inclined surface that is not perpendicular to the optical axis of glass fibers 11. As a connection partner of optical fiber connecting component 1D, optical connector 100 using an existing resin ferrule 102 is used. Specifically, optical connector 100 is configured such that an optical fiber is fixed by resin ferrule 102 configured of, for example, PPS. The tip of glass fibers 11 protrudes from the end face of resin ferrule 102 by about 5 μm to 10 μm. An end face 104 of the resin rule 102 has a spacer 106. As described above, since spacer 106 is provided on end face 104 of resin ferrule 102 of optical connector 100 to which optical fiber connecting component 1D is connected, additional processing is not required for optical fiber connecting component 1D including multi-hole glass plate 21D and multi-hole resin ferrule 31 made of a liquid crystal polymer. Also with this configuration, a gap is provided between the end face of glass fibers 11 of optical fiber connecting component 1D and the end face of the glass fiber of optical connector 100, and the glass fibers can be brought close to each other. Therefore, the same effects as those of the second modified example can be achieved.

(Fourth Modification)

Figure 12:
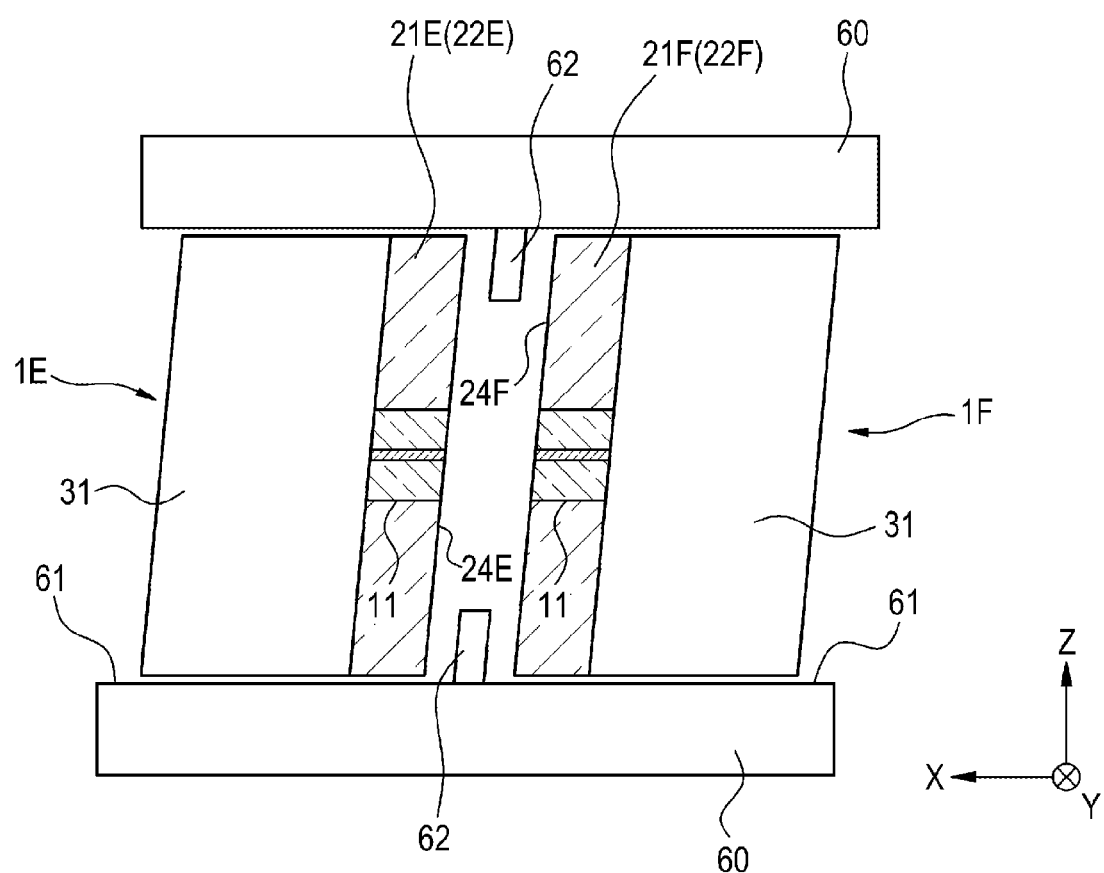
FIG. 12 is a conceptual diagram illustrating an optical fiber connecting component according to a fourth modified example.

FIG. 12 is a conceptual diagram illustrating an optical fiber connecting component according to a fourth modified example. FIG. 12 illustrates an optical fiber connecting component 1E, an optical fiber connecting component 1F to which optical fiber connecting component 1E is connected, and an adapter 60 that holds optical fiber connecting components 1E and 1F in a connected state.

Similar to optical fiber connecting components 1B and 1C of the second modification, rear faces 24E and 24F of multi-hole glass plates 21E and 21F included in optical fiber connecting components 1E and 1F according to the fourth modification are inclined surfaces that are not perpendicular to the optical axis of glass fibers 11. Adapter 60 holding optical fiber connecting components 1E and 1F has an opening 61 into which optical fiber connecting component 1E and optical fiber connecting component 1F are inserted from both sides, and a spacer 62 is provided inside opening 61 so as to protrude inward at a central portion thereof. As described above, by providing spacer 62 in adapter 60 holding optical fiber connecting components 1E and 1F, additional processing is not required for optical fiber connecting components 1E and 1F. According to this configuration as well, a gap is provided between the end face of glass fibers 11 of optical fiber connecting component 1E and the end face of glass fibers 11 of optical fiber connecting component 1F to be connected, and the glass fibers 11 can be brought close to each other. Therefore, the same effect as that of the second modified example can be achieved.

Although the embodiments of the present disclosure have been described above, it is needless to say that the technical scope of the present invention should not be restrictively interpreted by the description of the embodiments. It is understood by those skilled in the art that the present embodiment is merely an example, and various modifications of the embodiment can be made within the scope of the invention described in the claims. As described above, the technical scope of the present invention should be determined based on the scope of the invention described in the claims and the equivalent scope thereof. For example, the material constituting the resin ferrule does not have to be a liquid crystal polymer as long as it has the physical properties described in the claims.

DESCRIPTION OF REFERENCE NUMERALS 1, 1A, 1B, 1C, 1D, 1E, 1F optical fiber connecting component 10, 10a optical fibers
11 glass fibers
12 individual coating resin layer
13 bending portion
14 collective coating resin layer
20 fiber fixing part
21, 21B, 21C, 21D, 21E, 21F multi-hole glass plate (one example of glass plate)
22, 22B, 22C, 22D glass plate main body
23, 33 front face
24, 24B, 24C, 24D, 24E, 24F, 34 rear face
25 first through holes
25a, 38a straight portion
25b, 38b tapered portion
26, 37 guiding holes
31 multi-hole resin ferrule (one example of resin ferrule 102)
32 ferrule main body
35 front wall (of ferrule main body 32)
36 side walls (of ferrule main body 32)
38 second through holes
39 fiber holding holes
40 protrusion
42 air gap
45 guide pins
50, 62, 106 spacer
60 adapter
61 opening
100 optical connector
102 resin ferrule
104 end face (of resin ferrule 102)

The invention claimed is:

1. An optical fiber connecting component comprising:
a glass plate having a plurality of first through holes;
a resin ferrule fixed to the glass plate and having a plurality of second through holes that are each coaxial with corresponding one of the plurality of first through holes; and
a plurality of optical fibers arranged on a surface of the resin ferrule,
one or more glass fibers disposed within each of the plurality of optical fibers, a surface of each of the glass fibers being covered with a resin coating, and a portion of each of the glass fibers being exposed from a tip of each of the optical fibers,
wherein the exposed portion of each of the glass fibers is held in corresponding one of the first through holes and corresponding one of the second through holes, and
a material for the resin ferrule has a flexural modulus of 5 GPa or more at 200° C.

2. The optical fiber connecting component according to claim 1, wherein the material is a liquid crystal polymer.

3. The optical fiber connecting component according to claim 1, wherein the material has a thermal shrinkage of 0.5% or less upon heating from room temperature to a temperature of 200° C. or higher.

4. The optical fiber connecting component according to claim 1, wherein the plurality of optical fibers held in the plurality of first through holes and the plurality of second through holes have a variation in inclination of 0.5 degree or less.

5. The optical fiber connecting component according to claim 1, wherein the glass plate has a front face that has a P-V value of 5 µm or less when the glass plate is heated at 200° C. or higher, and
wherein the P-V value is a sum of a distance from an average plane approximating an end face of the resin ferrule to a most protruding point and a most recessed point of the resin ferrule.

6. The optical fiber connecting component according to claim 1, wherein the plurality of first through holes is two-dimensionally arranged at one section of the glass plate.

7. The optical fiber connecting component according to claim 1, wherein the glass fiber protrudes from an end face of the glass plate by 50 nm to 1 µm.

8. The optical fiber connecting component according to claim 1,
wherein the glass plate has a first guiding hole, and
the resin ferrule has a second guiding hole that is coaxial with the first guiding hole.

9. The optical fiber connecting component according to claim 1, wherein the glass fiber has an outer diameter of 100 µm or less.

10. The optical fiber connecting component according to claim 1, wherein each of the plurality of optical fibers is a multi-core optical fiber including, as the glass fiber, a plurality of cores and a cladding that surrounds the plurality of cores.

11. An optical fiber connecting structure in which a first optical fiber connecting component serving as an optical fiber connecting component comprising: a glass plate having a plurality of first through holes; a resin ferrule fixed to the glass plate and having a plurality of second through holes that are each coaxial with corresponding one of the plurality of first through holes; and a plurality of optical fibers including a glass fiber and a resin coating that covers the glass fiber, wherein the glass fiber exposed from a tip of each of the optical fibers is held in corresponding one of the first through holes and corresponding one of the second through holes, and a material for the resin ferrule has a flexural modulus of 5 GPa or more at 200° C. and a second optical fiber connecting component fixed to the first optical connecting component and having a plurality of optical fibers in an arrangement corresponding to an arrangement of the plurality of optical fibers in the first optical fiber connecting component are connected, wherein
a first end face of the first optical fiber connecting component and a second end face of the second optical fiber connecting component are faces inclined with respect to an optical axis of the plurality of optical fibers, and
a gap of 30 µm or less is formed between the first end face and the second end face.

12. The optical fiber connecting structure according to claim 11,
wherein the second optical fiber connecting component is the optical fiber connecting component in claim 11, and
a spacer for forming the gap is provided at an end face of the glass plate of at least one of the first optical fiber connecting component and the second optical fiber connecting component.

13. The optical fiber connecting structure according to claim 11, wherein the second optical fiber connecting component is provided by mounting the plurality of optical fibers in a resin ferrule, and
a spacer for forming the gap is provided at an end face of the second optical fiber connecting component.

14. The optical fiber connecting structure according to claim 11 further comprising an adapter, the adapter fitting to the first optical fiber connecting component and the second optical connecting component so as to connect the first optical fiber connecting component and the second optical fiber connecting component, wherein
  the second optical fiber connecting component is the optical fiber connecting component in claim 11 or a component provided by mounting the plurality of optical fibers in a resin ferrule, and
  a spacer for forming the gap is provided in the adapter of the optical fiber connecting structure.

* * * * *